E. JUELSON.
VEHICLE WHEEL.
APPLICATION FILED SEPT. 10, 1915.

1,184,100.

Patented May 23, 1916.
2 SHEETS—SHEET 1.

Witnesses
Hugh H. Ott

Inventor
E. Juelson
By Victor J. Evans
Attorney

E. JUELSON.
VEHICLE WHEEL.
APPLICATION FILED SEPT. 10, 1915.
1,184,100.
Patented May 23, 1916.
2 SHEETS—SHEET 2.
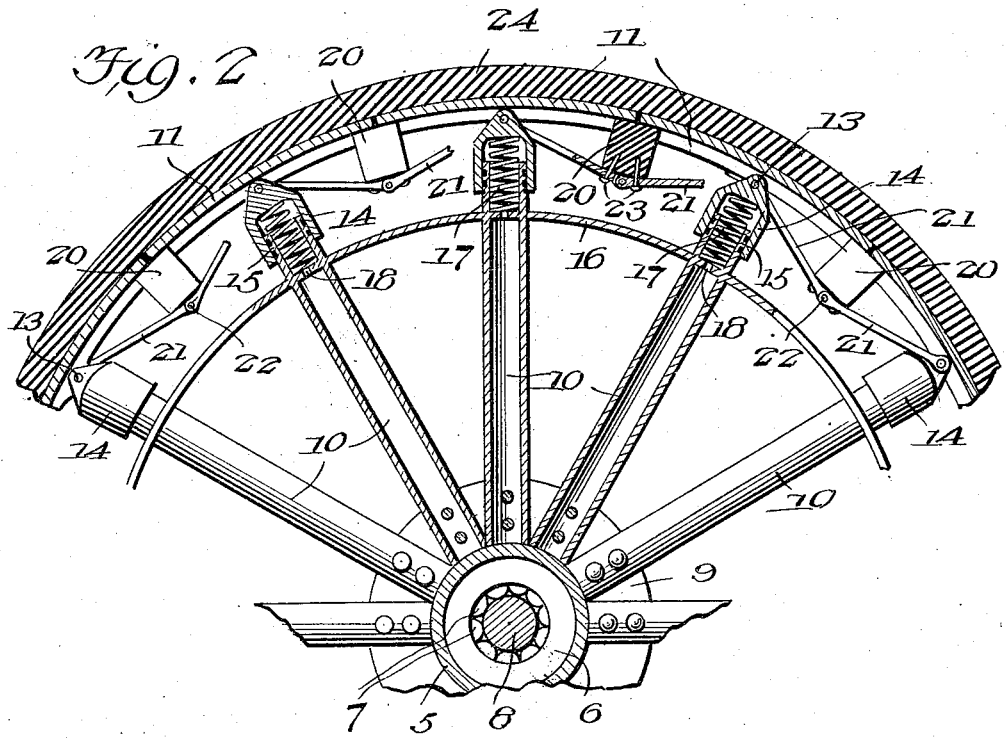
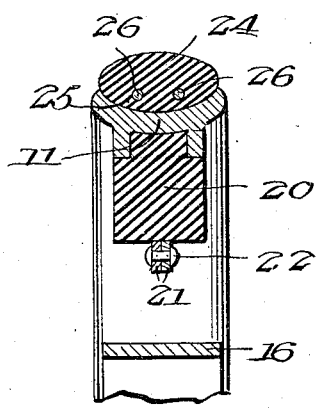
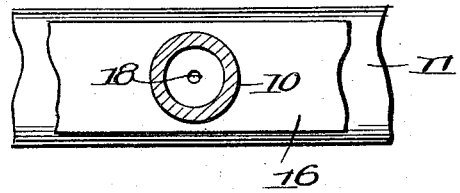
Inventor
E. Juelson
By Victor J. Evans
Attorney
Witnesses

UNITED STATES PATENT OFFICE.

EDWIN JUELSON, OF CULBERTSON, MONTANA.

VEHICLE-WHEEL.

1,184,100.  Specification of Letters Patent.  Patented May 23, 1916.

Application filed September 10, 1915. Serial No. 50,008.

*To all whom it may concern:*

Be it known that I, EDWIN JUELSON, a citizen of the United States, residing at Culbertson, in the county of Sheridan and State of Montana, have invented new and useful Improvements in Vehicle-Wheels, of which the following is a specification.

The invention relates to vehicle wheels, and more particularly to the class of resilient wheels for automobiles, vehicles, or the like.

The primary object of the invention is the provision of a wheel of this character wherein the required resiliency is had without the use of pneumatic tires, thereby relieving all shocks and jars from the body of the automobile, vehicle, or the like, and assuring maximum life both to the wheels and the said body.

Another object of the invention is the provision of a wheel of this character wherein the construction thereof is novel in form to absorb shocks and jars and to give strength and durability thereto.

A further object of the invention is the provision of a wheel of this character which is simple in construction, thoroughly reliable and efficient in operation, and inexpensive in manufacture.

With these and other objects in view, the invention consists in the construction, combination and arrangement of parts as will be hereinafter fully described, illustrated in the accompanying drawings, and pointed out in the claims hereunto appended.

Figure 1:
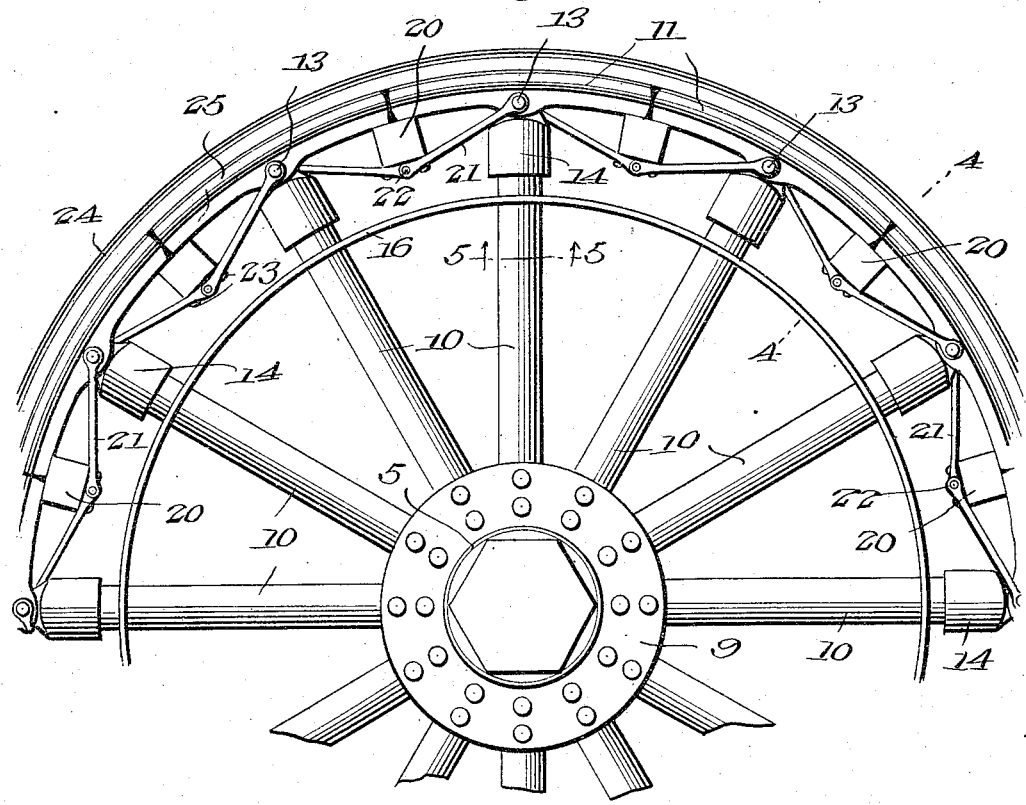
Figure 3:
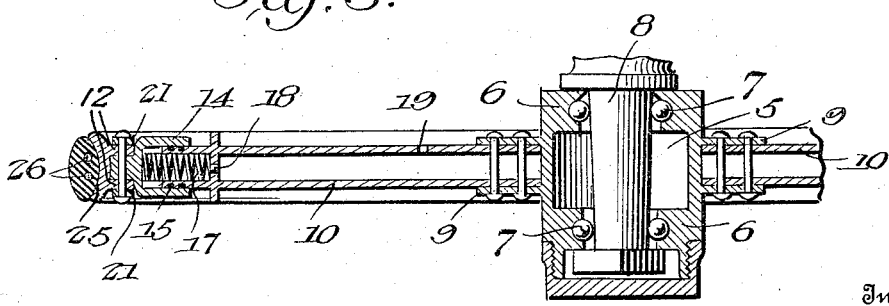

In the drawings: Figure 1 is a side elevation of a resilient wheel constructed in accordance with the invention. Fig. 2 is a fragmentary vertical longitudinal sectional view. Fig. 3 is a vertical transverse sectional view. Fig. 4 is a sectional view on the line 4—4 of Fig. 1. Fig. 5 is a sectional view on the line 5—5 of Fig. 1.

Similar reference characters indicate corresponding parts throughout the several views in the drawings.

Referring to the drawings in detail, the resilient wheel comprises a hub 5, preferably made from metal, having internal ball cones 6 supporting bearing balls 7 which are arranged therein in any approved manner for travel upon an axle spindle 8 which is of the ordinary well-known construction.

Concentrically disposed about the hub 5 intermediate its ends are spoke flanges 9, between which are secured the inner ends of spokes 10, preferably in the form of tubes projecting radially from the hub, while concentrically disposed relative to these spokes 10 is an outer felly or rim made from a plurality of sections 11 each being formed medially thereof with pintle eyes 12 spaced from each other and receiving pivot pintles 13 swingingly connecting thereto air cylinders 14 in which telescope the pistons 15 mounted upon an inner rim or ring 16 fixed to the outer ends of the spokes 10, the pistons 15 being in alinement with the latter and form housings for compression springs 17 which work against the closed ends of the cylinders and the inner rim or ring 16 so as to absorb excessive shocks and jars incident to the travel of the wheel.

The inner rim or ring 16 is formed with valve ports 18 which are located within the spokes 10, the same being formed with air holes 19 so that air will be admitted to the cylinders when the outer felly or rim is displaced relative to the hub of the wheel.

Supported upon the outer rim or felly intermediate the points of location of the air cylinders 14 are resilient blocks 20, preferably made from rubber, and serve as cushions, while bridging these blocks 20 are pivotally connected double links 21 which are loosely connected together through the medium of the pivots 22 and also are loosely connected to the pivot pintles 13. To prevent the displacement of the blocks 20 the double links 21 have passed therethrough fasteners 23 which are engaged in the blocks to hold the same permanent and against any undue displacement, yet permitting the said blocks to expand and contract during the travel of the wheel.

Surrounding the outer rim or felly is a solid rubber tire 24 which is fastened to the felly in any suitable manner and is supported in a channel 25 formed in the felly or rim, while embedded in the tire 24 are the annular reinforcing wires 26, the wheel being possessed of maximum resiliency to absorb all shocks and jars incident to the travel thereof. The sections 11 of the felly or rim have their ends adjacent each other slightly spaced apart.

From the foregoing description, taken in connection with the accompanying drawings the construction and manner of operation of the device will be clearly understood, and therefore a more extended explanation has been omitted.

What is claimed as new is:—

1. A resilient wheel comprising a hub, hollow spokes mounted concentrically about the same and extending radially therefrom, a sectional rim concentrically disposed relative to the outer ends of the spokes, air cylinders pivoted to the sections of the rim, an inner rim fixed to the spokes, the said spokes being provided with air holes, the said inner rim being provided with valved air ports for communication with the cylinders, and pistons fixed to the inner rim and telescoped within the air cylinders.

2. A resilient wheel comprising a hub, hollow spokes mounted concentrically about the same and extending radially therefrom, a sectional rim concentrically disposed relative to the outer ends of the spokes, air cylinders pivoted to the sections of the rim, an inner rim fixed to the spokes, the said spokes being provided with air holes, the said inner rim being provided with valved air ports for communication with the cylinders, pistons fixed to the inner rim and telescoped within the air cylinders, cushion members carried by the sectional rim intermediate the air cylinders, and double links pivoted to each other and to the connections of the air cylinders with the sectional rim and bridging the cushion members.

3. A resilient wheel comprising a hub, hollow spokes mounted concentrically about the same and extending radially therefrom, a sectional rim concentrically disposed relative to the outer ends of the spokes, air cylinders pivoted to the sections of the rim, an inner rim fixed to the spokes, the said spokes being provided with air holes, the said inner rim being provided with valved air ports for communication with the cylinders, pistons fixed to the inner rim and telescoped within the air cylinders, cushion members carried by the sectional rim intermediate the air cylinders, double links pivoted to each other and to the connections of the air cylinders with the sectional rim and bridging the cushion members, and fasteners passed through the links and engaged in the cushion members to prevent displacement thereof.

4. A resilient wheel comprising a hub, hollow spokes mounted concentrically about the same and extending radially therefrom, a sectional rim concentrically disposed relative to the outer ends of the spokes, air cylinders pivoted to the sections of the rim, an inner rim fixed to the spokes, the said spokes being provided with air holes, the said inner rim being provided with valved air ports for communication with the cylinders, pistons fixed to the inner rim and telescoped within the air cylinders, cushion members carried by the sectional rim intermediate the air cylinders, double links pivoted to each other and to the connections of the air cylinders with the sectional rim and bridging the cushion members, fasteners passed through the links and engaged in the cushion members to prevent displacement thereof and a resilient tire encircling the sectional rim.

In testimony whereof I have affixed my signature in presence of two witnesses.

EDWIN JUELSON.

Witnesses:
A. W. HUXOL,
H. C. DE LANG.

Copies of this patent may be obtained for five cents each, by addressing the "Commissioner of Patents, Washington, D. C."